(12) United States Patent
Ben-Or et al.

(10) Patent No.: US 10,803,403 B2
(45) Date of Patent: Oct. 13, 2020

(54) METHOD FOR ADAPTIVE TUNING VIA AUTOMATED SIMULATION AND OPTIMIZATION

(71) Applicant: NICE LTD., Ra'anana (IL)

(72) Inventors: Pinchas Ben-Or, Issaquah, WA (US); Diana Shnaider, Modi'in (IL); Yoav Avneon, Nes-Ziona (IL)

(73) Assignee: NICE LTD., Ra'anana (IL)

( * ) Notice: Subject to any disclaimer, the term of this patent is extended or adjusted under 35 U.S.C. 154(b) by 772 days.

(21) Appl. No.: 15/592,766

(22) Filed: May 11, 2017

(65) Prior Publication Data
US 2018/0330268 A1    Nov. 15, 2018

(51) Int. Cl.
| | |
|---|---|
| *G06N 20/00* | (2019.01) |
| *G06N 7/00* | (2006.01) |
| *G06N 20/20* | (2019.01) |
| *G06N 5/00* | (2006.01) |
| *G06Q 30/00* | (2012.01) |
| *G06Q 40/02* | (2012.01) |

(52) U.S. Cl.
CPC ............ *G06N 20/00* (2019.01); *G06N 5/003* (2013.01); *G06N 7/005* (2013.01); *G06N 20/20* (2019.01); *G06Q 30/0185* (2013.01); *G06Q 40/02* (2013.01)

(58) Field of Classification Search
CPC .......... G06N 7/00; G06N 7/005; G06N 99/00; G06N 99/005; G06Q 30/00; G06Q 30/0185; G06Q 40/02
See application file for complete search history.

(56) References Cited

U.S. PATENT DOCUMENTS

| | | | |
|---|---|---|---|
| 9,294,497 B1 * | 3/2016 | Ben-Or | ............... H04L 63/1433 |
| 10,025,778 B2 * | 7/2018 | Gao | ...................... G06F 40/44 |
| 2010/0094767 A1 * | 4/2010 | Miltonberger | ....... G06Q 10/067 |
| | | | 705/325 |

(Continued)

OTHER PUBLICATIONS

Xu, Lei. "BYY harmony learning, independent state space, and generalized APT financial analyses." IEEE Transactions on Neural Networks 12.4 (2001): 822-849. (Year: 2001).*

(Continued)

*Primary Examiner* — Kamran Afshar
*Assistant Examiner* — Randall K. Baldwin
(74) *Attorney, Agent, or Firm* — Pearl Cohen Zedek Latzer Baratz LLP

(57) ABSTRACT

A computer implemented method and system for optimization of model parameters of at least one predictive model for detecting suspicious financial activity. The processor may select a reduced set of key indicators and corresponding scores to optimize from each of the at least one predictive model, each key indicator and corresponding score in the reduced set having an influence ranking above a predetermined influence ranking. The processor may select a best performing model candidate based on an evaluation of each reduced set of key indicators and corresponding scores. The processor may preform gradient-ascent optimization on the best performing model candidate and the at least one random model to generate a set of at least two new models for each of the best performing model candidate and the at least one random model. The processor may select the new model with the highest performance ranking.

18 Claims, 5 Drawing Sheets

(56) References Cited

U.S. PATENT DOCUMENTS

| | | | | |
|---|---|---|---|---|
| 2013/0103764 | A1* | 4/2013 | Verkasalo | G06N 5/04 |
| | | | | 709/204 |
| 2013/0305356 | A1* | 11/2013 | Cohen-Ganor | G06Q 40/00 |
| | | | | 726/22 |
| 2014/0365201 | A1* | 12/2014 | Gao | G06F 40/44 |
| | | | | 704/2 |
| 2015/0026027 | A1* | 1/2015 | Priess | G06Q 40/00 |
| | | | | 705/35 |
| 2015/0293755 | A1* | 10/2015 | Robins | G06F 8/35 |
| | | | | 717/104 |
| 2017/0228639 | A1* | 8/2017 | Hara | G06N 3/08 |
| 2018/0225605 | A1* | 8/2018 | Fabara | G06Q 10/0635 |
| 2018/0285788 | A1* | 10/2018 | Andrei | G06Q 10/04 |

OTHER PUBLICATIONS

Gold, Carl, and Peter Sollich. "Model selection for support vector machine classification." Neurocomputing 55.1-2 (2003): 221-249. (Year: 2003).*

Bobal et al., "Adaptive Predictive Control of Time-Delay Systems." SciVerse ScienceDirect, (2013), pp. 165-176. Zlin, Czech Republic. http://www.elsevier.com/locatecamwa.

Giovanini et al. "Adaptive Predictive Control using Multiple Models, Switching and Tuning" International Journal of Control, Automation, and Systems, vol. 4, No. 6, pp. 669-681 Dec. 2006.

\* cited by examiner

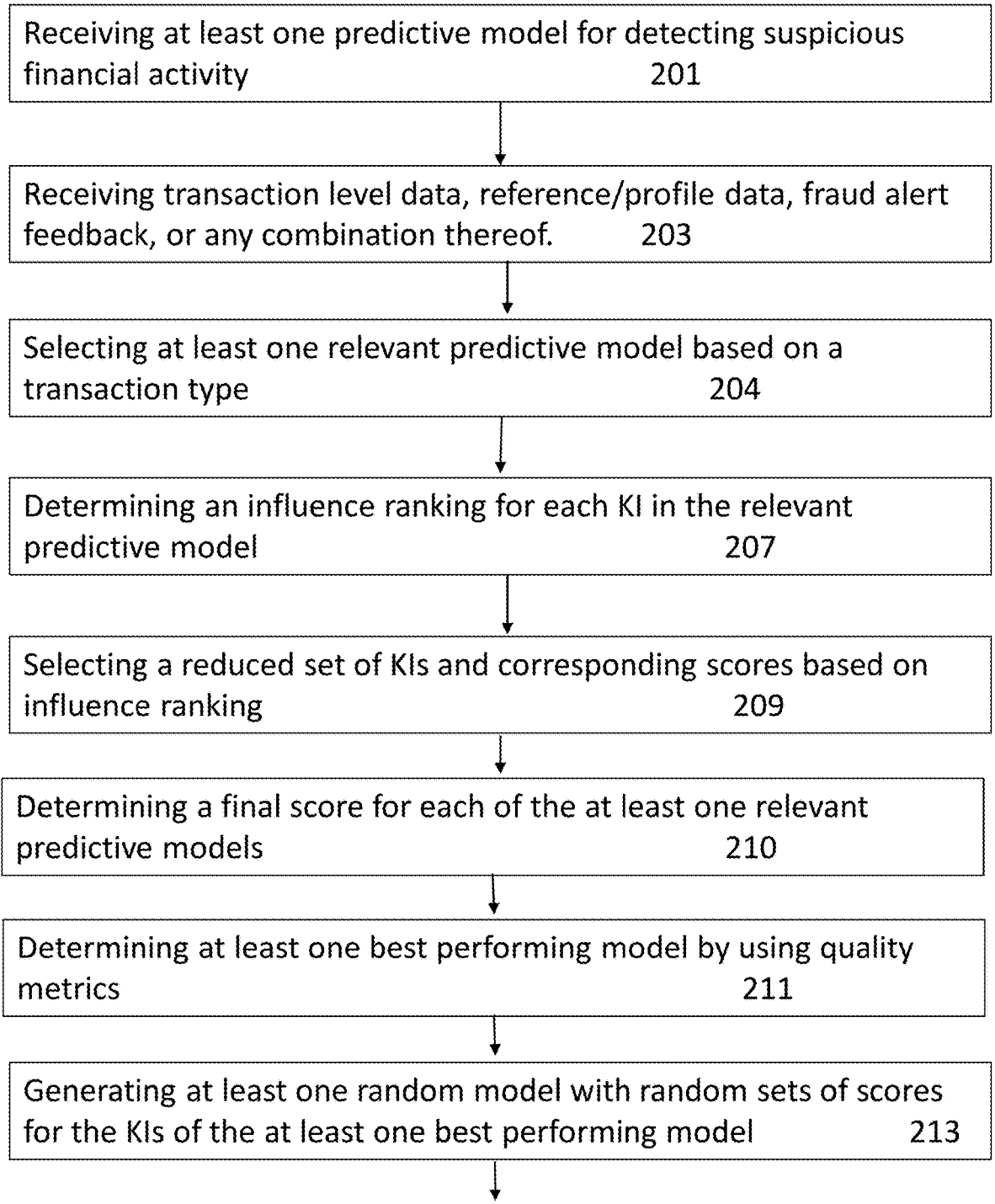

FIG.2
Continued

Performing gradient-ascent and functional optimization on the at least one best performing model and the at least one random model to generate a set of at least two new models for each of the at least one best performing model and each of the at least one random model    215

Calculating performance of the set of generated new models using quality metrics, and selecting a best performing new model from the set of generated new models    217

Determining a level of improvement between the best performing generated new model and the at least one best performing model    219

If the level of improvement between the best performing generated new model and the at least one best performing model is equal to or below a predetermined threshold.

If the level of improvement between the best performing generated new model and the at least one best performing model is above a predetermined threshold.

Selecting the best performing generated new model as an optimized predictive model.    223

Iteratively performing Steps 213-219 with the best performing generated new model until the level of improvement is equal to or below the predetermined threshold    221

METHOD FOR ADAPTIVE TUNING VIA AUTOMATED SIMULATION AND OPTIMIZATION

FIELD OF THE INVENTION

The present invention relates to a self-adaptive method for automatic tuning of behavioral and risk models for rare event prediction using, for example, a combination of a specialized Semi-Markov Bayesian machine-learning algorithm, behavioral risk pattern-forcing, optimized simulations, and Knowledge Engineering. In particular, the invention relates to automatically tuning a predictive model for detecting for example suspicious financial activity.

BACKGROUND OF THE INVENTION

Fraud is a global problem that has required more attention due to an accentuated expansion of modern technology and communication. Fraud detection is based on analyzing past transactional and case disposition data which may be used to build and tune behavioral and risk models. Whether a fraud detection model is accurate enough to provide correct classification of the case as fraudulent or legitimate is a critical factor when statistical techniques are used to detect fraud.

Tuning of behavioral and risk models for rare event prediction may include adjustment and optimization of model parameters to ensure operational effectiveness (e.g. high detection rate, low false-positive rate). Predictive models for rare events (such as suspicious financial activity) require knowledge engineering, as data-driven techniques may be insufficient and inefficient. In statistical Bayesian terms, predicting rare events relies heavily on knowledge-engineered predictive features (KIs) which are assigned a high a-priori probability of correlation with a target event.

Today, tuning of behavioral and risk models for rare event prediction is a complex and demanding process involving a great deal of human/expert judgment. As such, it is a very resource demanding process (expensive and time consuming).

In certain fields (mainly risk predictions, such as security issues/events, insurance, failure of components/modules in engineering etc.), the objective function is to use data mining and predictive analytics to predict rare events.

Further, there is typically a high cost of error with predicting rare events. For example in the insurance sector, the ability to predict fraud is a significant challenge for many insurance organizations. Specifically, with Accident Benefit claims, there are loss amounts, which may be in excess of $500,000 relative to an average loss amount of $30,000. The ability to better predict these rare events has always been a lofty and challenging goal but one that may accrue significant benefits to insurers.

Because there is a high cost of error with predicting rare events such as suspicious financial activity, standard machine learning algorithms for predicting rare events require a significant amount of human judgment to combine with data analysis.

Another current method for tuning a behavioral risk model for detecting suspicious financial activity includes the concept of bootstrap aggregating ("bagging"). Bagging may include generating multiple classifiers by obtaining the predicted values from the adjusted models to several replicated datasets and then combining them into a single predictive classification in order to improve the classification accuracy.

Another current method for tuning a behavioral risk model for detecting suspicious financial activity includes the use of random forests which is an ensemble learning method for classification, regression and other tasks, that operate by constructing a multitude of decision trees at training time and outputting the class that is the mode of the classes (classification) or mean prediction (regression) of the individual trees.

Accordingly, with respect to the above, tuning behavioral and risk models for rare event prediction such as detecting suspicious financial activity is prohibitively expensive and time-consuming. Thus, it is a major barrier for entering the mid-low market and for maintaining high-quality models in production.

Therefore, it would be desirable to provide a method to automatically tune behavioral and risk models for rare event prediction such as detecting suspicious financial activity that may for example requires less memory, less processing power, and less iterations.

SUMMARY OF THE INVENTION

According to embodiments of the present invention, there is provided a computer implemented method and system for optimization of model parameters of at least one predictive model for detecting suspicious financial activity. The predictive model may be used for determining a risk score and the predictive model may include functions. The functions may each have a plurality of key indicators and a score corresponding to each of the key indicators. Each of the key indicators may be a range of values corresponding to its function.

Embodiments of the present invention may include receiving, by a processor, the at least one predictive model. Information regarding financial transaction data, financial account profile data, fraud alert feedbacks, or any combination thereof may be received by the processor. The processor may determine an influence ranking for each key indicator in the at least one predictive model based on the received information and based on sensitivity analysis techniques. The processor may select a reduced set of key indicators and corresponding scores to optimize from each of the at least one predictive model, each key indicator and corresponding score in the reduced set having an influence ranking above a predetermined influence ranking.

The processor may evaluate each reduced set of key indicators and corresponding scores using quality metrics, and based on this evaluation, the processor may select a best performing model candidate. The processor may generate at least one random model, the random model having random sets of scores for key indicators of the initial best performing model. The processor may perform gradient-ascent functional optimization on the initial best performing model and the at least one random model to generate a set of at least two new models for each of the initial best performing model and the at least one random model. The processor may calculate a performance ranking of each new model in the set of new models. The processor may select an optimized model. The optimized model may be the new model with the highest performance ranking.

In some embodiments of the invention, the processor may determine a level of improvement between the optimized model and the best performing model candidate.

If the level of improvement between the optimized model and the best performing model candidate is above a predetermined threshold, the processor can, iteratively, generate at least one new random model, perform gradient-ascent functional optimization on the optimized model and the at least one random model to generate a set of at least two additional models for each of the optimized model and the at least one new random model, calculate a performance ranking of each additional model in the set of additional models, select a new optimized model, wherein the new optimized model is the additional model with the highest performance ranking, determine a level of improvement between the additional model with the highest performance ranking and the optimized model, and replace the scores for the optimized model with the scores of the new optimized model if the new optimized model is an improvement of the optimized mode. The at least one new random model may have random sets of scores for key indicators of the optimized model.

If the level of improvement between the optimized model and the best performing model candidate is equal to or below a predetermined threshold, the processor may select the optimized model for detecting suspicious financial activity.

In some embodiments of the invention, the processor may select at least one relevant model from the received at least one predictive model based on a type of a financial account from which funds are to be transferred from, the amount of money being transferred, or any combination thereof. The processor may determine the influence ranking for each key indicator in the at least one relevant model based on the received information and based on sensitivity analysis techniques. The processor may select the reduced set of key indicators and corresponding scores to optimize from the at least one relevant model.

In some embodiments of the invention, for each key indicator and corresponding score in the at least one predictive model, the processor may determine if there is another key indicator and corresponding score in the at least one predictive model which forms a pair of key indicators with a Pearson value over a predetermined Pearson value. For each pair of key indicators with a Pearson value over the predetermined Pearson value, the processor may remove the key indicator and corresponding score of the key indicator with lowest influence ranking in the pair of key indicators with a Pearson value over the predetermined Pearson value from the reduced set of key indicators. The predetermined Pearson value may be approximately 0.7.

In some embodiments of the invention, the processor may determine the risk score of the transaction by adding together each score for each triggered key indicator in the optimized model. If the risk score of the transaction is above a predetermined risk score, the processor may notify an account holder of the account from which the transaction originated, block the transaction, request authentication from the account holder, or any combination thereof.

In some embodiments of the invention, the processor receives a plurality of predictive models. The processor may select more than one best performing model candidates based on the evaluation of each reduced set. The processor may perform the gradient-ascent functional optimization on the more than one best performing model candidates and the at least one random model to generate a set of at least two new models for each of the best performing model candidates and the at least one random model.

One advantage of embodiments of the present invention may include less memory usage, less processing power required, and less iterations than typically required for tuning behavioral and risk models used for example for detecting suspicious finical activity and essentially any predictive model (all models can be tuned by adjusting their parameters). For example, embodiments of the present invention may be used to tune models used to prevent the dissemination of private medical records, criminal records or any other rare event with a high cost of error. Another advantage of embodiments of the present invention may be that, one embodiment may tune models for very rare events where data-driven techniques are insufficient and inefficient.

Embodiments of the present invention may achieve these advantages by for example using advanced analytics for a smart and efficient automated simulations and optimization which may enable a much more profound search of the multidimensional space that represents the huge number of combinations of values for parameters (e.g., level set or a landscape of level sets). Embodiments of the present invention may allow for a smart search of this space, examining many more combinations/sets and in a more data-driven approach. As a result, embodiments of the present invention may offer significant reduction in the demand for memory, processing power, cost, and a minimized learning cycle time to tune behavioral and risk models for detecting suspicious finical activity cost reduction, an adaptive and better detection performance and minimizing learning cycle time. More specifically, embodiments of the present invention may reduce the amount of time and human intervention needed by utilizing justified directions to look at many more options at a faster rate One way of accomplishing this may be by adding a second layer of adaptive, or self-learning analytics. For example, embodiments of the present invention may combine many elements of knowledge engineering to enable automation (e.g. model patterns meta-data and its application for pattern forcing); use expert-derived metrics (including internal metrics that do not depend on an extensive amount for model quality); use multiple types of operational feedback (outcome) data to feed model learning; using innovative 'scoring' within the general paradigm of Markov Chains and Bayesian Networks; use gradient-ascent optimization; and/or run multiple simulations on multiple processors at the same time.

BRIEF DESCRIPTION OF THE DRAWINGS

The foregoing and other objects, features, and advantages of embodiments of the present invention, as well as the invention itself, is more fully understood from the following description of various embodiments, when read together with the accompanying drawings.

FIG. 2 is a flow diagram illustrating a method for adaptive tuning via automated simulation and optimization, according to an illustrative embodiment of the invention.

Figure 1A:
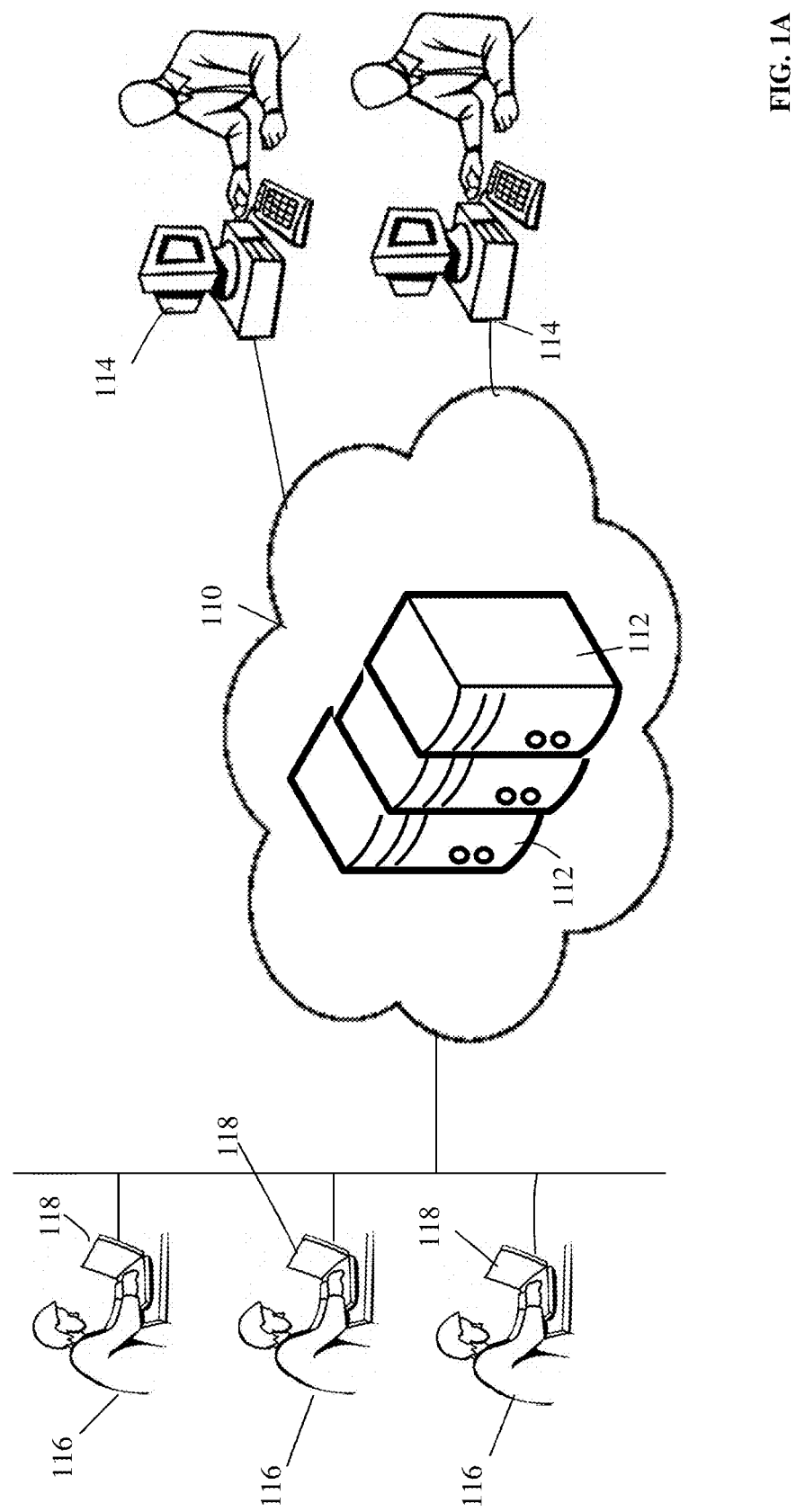
FIG. 1A shows a system according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that embodiments of the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof may occur or be performed simultaneously, at the same point in time, or concurrently.

Current methods for tuning behavioral risk models for rare events require a human expert for each specific type of potential fraudulent transaction to be detected. For example, current methods for tuning behavioral risk models for rare events require a lot of data; however, because the specific type of potential fraudulent transaction is a rare event, most of the data acquired regarding all financial transaction data is not relevant to a specific type of potential fraudulent transaction which one wishes to detect/prevent. Accordingly, current methods for tuning behavioral risk models for rare events require human experts to decide what data is relevant to a specific fraudulent transaction to be prevented.

In contrast, embodiments of the present invention allow for a completely automated process of tuning behavioral risk models by incorporating human judgments into special algorithms. Once a behavioral risk model for a specific rare event is tuned, the behavioral risk model is better able to detect the specific fraudulent transaction which the model was tuned for.

Reference is made to FIG. 1A, showing a system according to embodiments of the present invention. One or more servers 112 may carry out financial transaction and may be used to detect suspicious financial activity. Servers 112 may communicate with user or member computers 118 and vendor computers 114 via one or more networks such as Internet 110. User computers 118 may allow users 116 to carry out financial transactions such as sending or receiving funds, transferring funds from one account to another, viewing the balance of a financial account, and making changes to profile information for a financial account. Partner or vendor computers may allow partner or vendor organizations to interact with server 112 and user 116 by, for example, receiving funds from a user's financial account.

Figure 1B:
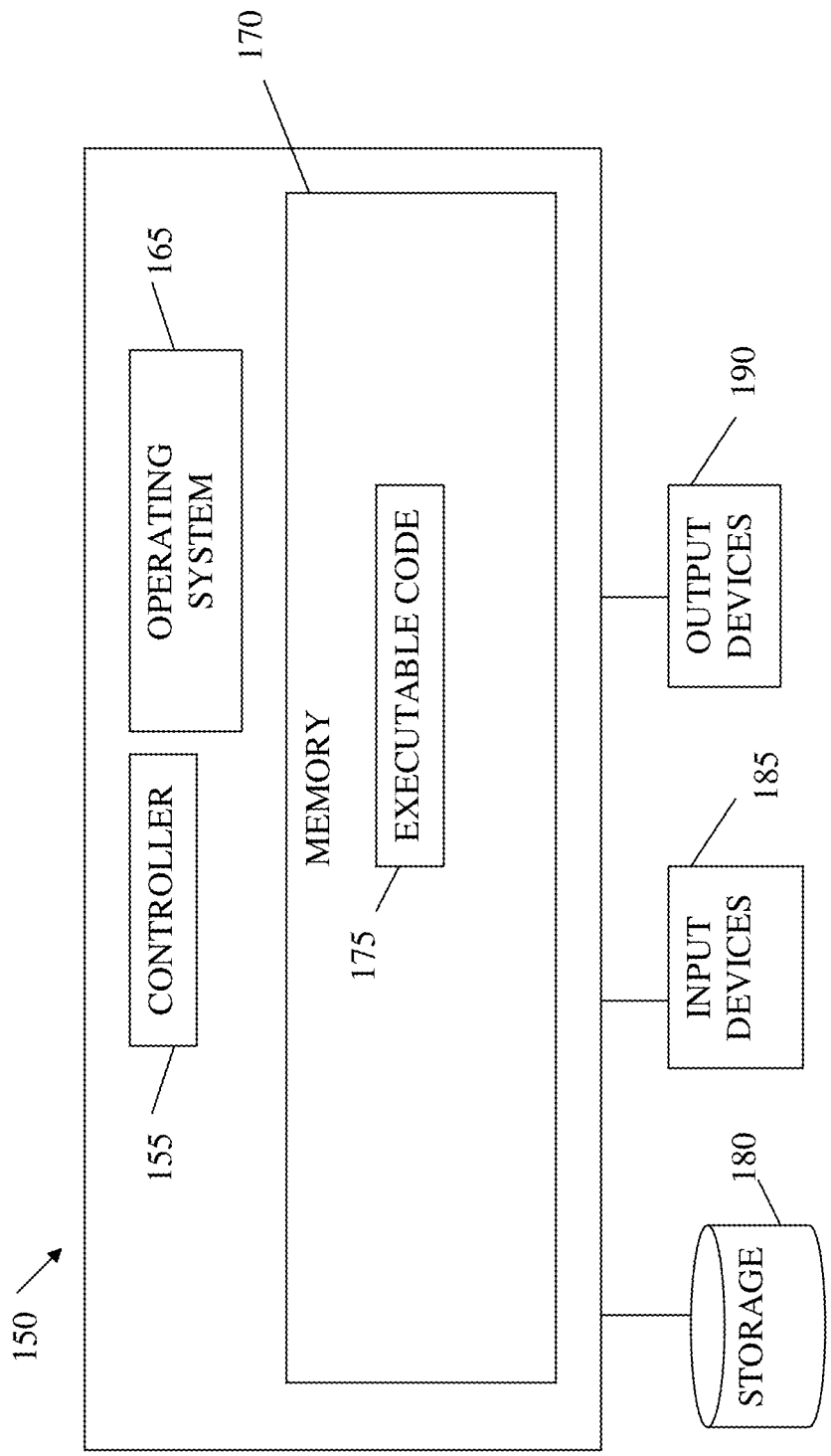
FIG. 1B shows a high level block diagram of an exemplary computing device according to embodiments of the present invention.

Reference is made to FIG. 1B, showing a high level block diagram of an exemplary computing device 150 according to some embodiments of the present invention.

Computing device 150 may be, for example, any of server(s) 112, user computer 118, or vendor computer 114, although the specific components and configuration may vary. Computing device 150 may include a controller 155 that may be, for example, a central processing unit processor (CPU), a chip or any suitable computing or computational device, an operating system 165, a memory 170, a storage 180, an input devices 185 and an output devices 190.

Operating system 165 may be or may include any code segment designed and/or configured to perform tasks involving coordination, scheduling, arbitration, supervising, controlling or otherwise managing operation of computing device 150, for example, scheduling execution of programs. Operating system 165 may be a commercial operating system. Memory 170 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 170 may be or may include a plurality of, possibly different memory units.

Executable code 175 may be any executable code, e.g., an application, a program, a process, task or script. Executable code 175 may be executed by controller 155 possibly under control of operating system 165. For example, executable code 175 may be an application for adaptive tuning via automated simulation and optimization. Computing device 150 and executable code 175 may be configured to update, process and/or act upon information at the same rate the information, or a relevant event, are received. In some embodiments, more than one computing device 150 may be used. For example, a plurality of computing devices that include components similar to those included in computing device 150 may be connected to a network and used as a system. For example, adaptive tuning via automated simulation and optimization may be performed in real-time by executable code 175 when executed on one or more computing devices such computing device 150.

Storage 180 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 180 and may be loaded from storage 180 into memory 170 where it may be processed by controller 155. In some embodiments, some of the components shown in FIG. 1B may be omitted. For example, memory 170 may be a non-volatile memory having the storage capacity of storage 180. Accordingly, although shown as a separate component, storage 180 may be embedded or included in memory 170.

Input devices 185 may be or may include, for example, a mouse, a keyboard, a touch screen or pad or any suitable input device. It will be recognized that any suitable number of input devices may be operatively connected to computing device 150 as shown by block 185. Output devices 190 may include one or more displays, speakers and/or any other suitable output devices. It will be recognized that any suitable number of output devices may be operatively connected to computing device 150 as shown by block 190. Any applicable input/output (I/O) devices may be connected to computing device 150 as shown by blocks 185 and 190. For example, a wired or wireless network interface card (NIC), a modem, printer or facsimile machine, a universal serial bus (USB) device or external hard drive may be included in input devices 185 and/or output devices 190.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out embodiments of the invention disclosed herein. For example, a storage medium such as memory 170, computer-executable instructions such as executable code 175 and a controller such as controller 155.

A non-transitory storage medium may include for example a memory, a disk drive, or a USB flash memory, encoding, including or storing instructions, e.g., computer-executable instructions, which when executed by a processor or controller, carry out embodiments of the invention disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system, according to some embodiments of the invention, may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the embodiments of the invention described herein are not constrained to a particular order or sequence. Additionally, some of the described embodiments or elements thereof may occur or be performed at the same point in time.

FIG. 2 is a flow diagram illustrating a method 200 for adaptive tuning via automated simulation and optimization, according to an illustrative embodiment of the invention. Tuning may include the adjustment and optimization of model parameters to ensure operation effectiveness such as a high detection rate and/or a low false-positive rate.

Embodiments of the invention may include receiving at least one predictive model for detecting suspicious financial activity (Step 201) (e.g., receiving, by computing device 150, as shown above in FIG. 1). The predictive model may include a function of a plurality of functions and parameters.

For example, a predictive model for determining whether a transfer of money is fraudulent may be:

$$R = af(x) + bf(y) + E \qquad \text{EQN. 1}$$

where R may be a risk score which may indicate the risk that a certain transaction is fraudulent; a may be a parameter representing a weight for the function $f(x)$; $f(x)$ may be a function which depends on an amount of money to be transferred; b may be a parameter representing a weight of $f(y)$; $f(y)$ may be a function which depends on an amount of time from the first time a user logged into a financial account from which the money is to be transferred; and E may be a parameter representing a probabilistic error term which may account for a variability in $f(x)$ and $f(y)$ that cannot be explained by a linear relationship with R.

Examples of functions that may be included in the predictive model for detecting suspicious financial activity may include for example, functions dependent on an amount of money transferred; an amount of failed log in attempts; an amount of positive or negative alerts; or other events or behavior.

Each function within the predictive model may have one or more key indicators ("KIs") representing different ranges of values that each function may have. Each KI may have (e.g. be multiplied by) a parameter which represents the score of the KI. Thus, different ranges of values for the same variable may have different parameters/scores. For example, if $f(x)$ is dependent on an amount of money transferred, and $f(y)$ is dependent on the amount of time from the first time a user logged into a financial account from which the money is to be transferred, then the following example level sets (KIs and parameters) may be used:

| f(x) | |
| --- | --- |
| Range of Money Transferred | Score |
| Amount of Money transferred between $0-$100 | 0 |
| Amount of Money transferred between $101-$500 | 20 |
| Amount of Money transferred between $501-$1,500 | 40 |
| Amount of Money transferred between $1,501-$10,000 | 60 |

| f(y) | |
| --- | --- |
| Amount of time from the first time a user logged into account | Score |
| Amount of time over 10 days | 0 |
| Amount of time between 5-10 days | 20 |
| Amount of time between 2-4 days | 40 |
| Amount of time between 0-1 days | 60 |

Each different range of values, such as between $0-$100, may be a bin, and each bin may have a score. Each score for each triggered KI for a function may be added together to generate the value of functions. The values of the functions such as $f(x)$ and $f(y)$ within the predictive model may be calculated, the values of the functions may be multiplied by their respective parameters and these values may be added to the parameter ε risk score R of a particular transaction. If the risk score R of a particular transaction is above a predetermined threshold, then the account holder may be notified, the transaction maybe blocked, the account holder may be asked for an authentication, or any combination thereof.

Each of the at least one predictive model received in Step 201 may be based on all users' past implementations of data, a specific user, a specific type of user, a specific type of transaction, or any combination thereof.

For example, in Step 201 four models may be received, an initial model, an auto-scoring basic model, an auto-scoring significance model (e.g., a different auto-scoring model taking into consideration statistical significance of observations), and a pattern forcing model, and each of these models may have different scores assigned to the same KIs, as can be seen in the following example chart:

Transaction level data, reference data from a financial account, profile data from a financial account, fraud alert feedback, or any combination thereof may be received. (Step 203) (e.g., receiving, by computing device 150, as shown above in FIG. 1).

For example, transaction level data such as whether a transaction was marked with a fraud tag, a date a transaction was marked with a fraud tag, suspicious activity report filed, and user feedbacks may be received.

Reference data can be data, such as an establishment date of an account, and whether an account is personal or for business. Profile data can be data on a history and activity of an account ("financial account history"), such as a total amount of transactions for a specific user within a specific

| KI # | KI Name | Bucket | Initial Scores | Auto-Scoring Basic Scores | Auto-Scoring Significance Scores | Pattern Forcing Scores |
|---|---|---|---|---|---|---|
| KI_1 | Amount of days from last transaction | 0-3 | 0 | 0 | 0 | 0 |
| KI_1 | Amount of days from last transaction | 4-7 | 10 | 5 | 5 | 10 |
| KI_1 | Amount of days from last transaction | 8-10 | 20 | 10 | 15 | 15 |
| KI_1 | Amount of days from last transaction | >10 | 30 | 20 | 20 | 20 |
| KI_2 | Amount of main entities per payee | 0-2 | 0 | 0 | 0 | 0 |
| KI_2 | Amount of main entities per payee | 3-5 | 20 | 10 | 5 | 10 |
| KI_2 | Amount of main entities per payee | >5 | 40 | 20 | 10 | 15 |
| KI_3 | Amount of Payees with low balances | 0-3 | 20 | 15 | 10 | 15 |
| KI_3 | Amount of Payees with low balances | 4-7 | 10 | 10 | 5 | 5 |
| KI_3 | Amount of Payees with low balances | >7 | 0 | 0 | 0 | 0 |
| KI_4 | TransactionsActivityShortPeriod | 0-7 | 0 | 0 | 0 | 0 |
| KI_4 | TransactionsActivityShortPeriod | 8-20 | 5 | 5 | 10 | 5 |
| KI_4 | TransactionsActivityShortPeriod | 21-100 | 10 | 10 | 20 | 10 |
| KI_4 | TransactionsActivityShortPeriod | >100 | 20 | 15 | 30 | 15 |
| KI_5 | If the card-present transaction occurred in a country where a card-present transaction has occurred for the account before | 0 | 0 | 0 | 0 | 0 |
| KI_5 | If the card-present transaction occurred in a foreign country where a card-present transaction has not occurred before | 1 | 5 | 10 | 15 | 10 |
| KI_6 | Transaction Amount | 0-500 | 0 | 0 | 0 | 0 |
| KI_6 | Transaction Amount | 501-1000 | 10 | 5 | 10 | 5 |
| KI_6 | Transaction Amount | >1000 | 20 | 15 | 15 | 10 |
| KI_7 | Amount of Point of Sale Transactions over a predetermined amount | 0-4 | 25 | 20 | 30 | 15 |
| KI_7 | Amount of Point of Sale Transactions over a predetermined amount | 5-10 | 15 | 10 | 20 | 10 |
| KI_7 | Amount of Point of Sale Transactions over a predetermined amount | 11-20 | 5 | 5 | 10 | 5 |
| KI_7 | Amount of Point of Sale Transactions over a predetermined amount | >20 | 0 | 0 | 0 | 0 |
| KI_8 | Amount of online transactions over a predetermined amount | 0-3 | 0 | 0 | 0 | 0 |
| KI_8 | Amount of online transactions over a predetermined amount | 4-7 | 5 | 5 | 5 | 10 |
| KI_8 | Amount of online transactions over a predetermined amount | >7 | 10 | 15 | 10 | 15 | period of time, the first ever transaction between a pair of parties, and the last transaction between a pair of parties may be received.

Feedback from fraud alert agents on fraud alerts such as a final workflow state, an alert quality determined by agent/investigator, an authentication outcome, a detection rate, a false-positive rate, a number of unauthorized scenarios detected, alert volume (ratio of alerted events), or any combination thereof may be received. Prior knowledge and information from a client such as transactional data and fraud case data may be received. Prior knowledge and information based on transactional data and fraud case data from all clients for a specific type of transaction may be received.

The transaction level data, reference data from a financial account, profile data from a financial account, fraud alert feedback may be received from, for example, a Risk Case Manager ("RCM") application. Different companies may utilize different field names in data tables containing the above mentioned data which may require the RCM to map a firm's field terminology to the RCM's filed terminology.

The RCM application may support an organizational compliance process for internal review and investigation of suspicious activities. The RCM may be, for example, a web-based application used by analysts, compliance professionals, managers, administrators and other principals involved in the process. The RCM may ensure that authorized staff receive score and filtered alerts, where each received score and filtered alert may be accompanied with all related alert information, alerts may be routed and handled according to the firm's procedures, alerts may be tracked and audited through resolution, evidence of a principal review may be provided, and internal reporting is available as a built-in feature, together with options for sending alert information by email and exporting information to other file formats.

At least one relevant predictive model may be selected from the at least one predictive model received in Step 201 based on a specific type of transaction which is being evaluated for suspicious financial activity (Step 204) (e.g., selecting, by the computing device 150, as shown above in FIG. 1). For example, personal money transfers involve different patterns than corporate money transfers and thus models for personal money transfers need to be tuned differently than corporate money transfers which typically involve significantly larger funds. In some embodiments of the invention, a subset of relevant data may be selected from the data received in Step 203 based on the specific type of transaction.

An influence ranking from each KI and corresponding score from each relevant predictive model selected in Step 204 may be determined, by performing known sensitivity analysis techniques based on the data received in Step 203 (Step 207). (e.g., determining, by the computing device 150, as shown above in FIG. 1). The influence ranking may be for example a measure of how much influence a change in a variable/parameter would exhibit over the accuracy of the predictive model. For example, sensitivity analysis techniques may include changing a single KI's score from the starting models (e.g., the models received in Step 201 and/or selected in Step 204) and measuring an effect on the final score of the starting model.

A reduced set of KIs and corresponding scores for tuning may be selected based on the determined influence ranking of the KIs of the starting model (Step 209) (e.g., selecting by the processor 150, as shown above in FIG. 1). A KI and corresponding score may be selected for the reduced set if, for example, the KI and corresponding score has an influence ranking above a predetermined influence ranking threshold. For example, the predetermined influence ranking threshold could be 0.3:

| KI | Influence Ranking | Keep? |
|---|---|---|
| KI_1 | 0.437 | Yes |
| KI_2 | 0.603 | Yes |
| KI_3 | 0.006 | No |
| KI_4 | 0.603 | Yes |
| KI_5 | 0.321 | Yes |
| KI_6 | 0.265 | No |
| KI_7 | 0.085 | No |
| KI_8 | 0.048 | No |

In some embodiments of the invention, KIs which are highly correlated may be grouped together, and the reduced set of KIs and corresponding scores does not include more than one KI from the same group of highly correlated variables. Correlation between KIs can be determined Pearson correlation coefficient of pairs of KIs in the reduced set of KIs. For example, a pair of KIs may be highly correlated if the pair has a Pearson value over a predetermined Pearson value. The predetermined Pearson value may be approximately 0.7. A Pearson value that is approximately 0.7 may be a Pearson value that is within a range of plus and minus ten percent of 0.7. If a pair of KIs is determined to be highly correlated, than the KI with the highest influence ranking.

For example, if KI_3 and KI_5 of the above table of KIs and influence rankings were highly correlated, then only KI_5 would be selected for the reduced set of KIs as it has the higher influence ranking.

If more than one relevant predictive model is selected in Step 204, a final score for each of the more than one relevant predictive models selected in Step 204 may be determined by performing auto-scoring techniques. (Step 210) (e.g., determining, by the computing device 150, as shown above in FIG. 1).

Auto-scoring techniques may include for example ensemble modeling and basic grid sampling the first set of level sets based on Markov Chains, Bayesian Networks, and pattern forcing. Ensemble modeling may include running or executing two or more related but different analytical models and then synthesizing the results into a single score or spread in order to improve the accuracy of predictive analytics and data mining.

The Markov Chains component may include analyzing information regarding KIs and scores over a period of time together. Each time period may have a number of events in which a specific KI was triggered for each outcome. In turn these counts are used to calculate odds ratios (such as Lift Ratio).

Further, different weights may be given to different time periods. For example, recent activity, for example in the last ten days, may be more relevant than older data, for example from a month ago because fraud patterns change overtime. However, if the time period is too recent, for example before an investigation can be performed, then the data may be less accurate and may be given a low weight.

The Bayesian Network component may include using odds ratios, such as lift ratios, based on outcomes which in turn are transformed to scores using different functions. Odds ratios may then be transformed into scores using scorecards. Adding multiple sources enriches the potential outcomes and different sources are assigned with weights for the calculation of the final score.

As stated above, each function in the predictive model may have a plurality of KIs each having a range of values, and a corresponding score for each KI. Each KI of each of the relevant predictive models selected in Step 204 may be triggered or not triggered. Each KI may have a scorecard. A final score for each of the more than one relevant predictive models selected in Step 204 may be generated. A final score may be a function of all KI scores and parameters of a predictive model from the more than one relevant predictive models selected in Step 204.

In some embodiments of the invention, pattern forcing may be used to automate determining the final scores of each of the more than one relevant predictive models selected in Step 204. Pattern forcing may include, based on a predefined pattern and input values, using mathematical minimization of the at least one relevant predictive model to obtain output values satisfying the predefined pattern. The predefined pattern may include monotonic risk increasing, monotonic risk decreasing, peak maximization, valley maximization, and binary maximization. The main purpose of pattern forcing is to automate the scoring of each KI.

The pattern for monotonic risk increasing may be, for example:

$$x1 \leq x2 \leq x3 \leq \ldots \leq xn \qquad \text{EQN. 2}$$

where n is an amount of buckets (different ranges of values and scores) for a function, such as $f(x)$ from EQN. 1, within the at least one relevant predictive model, and x1, x2, and x3 are scores for the $n^{th}$ bucket of a KI for the function, such as $f(x)$ from EQN. 1.

The pattern for monotonic risk decreasing may be, for example:

$$x1 \geq x2 \geq x3 \geq \ldots \geq xn \qquad \text{EQN. 3}$$

The pattern for peak maximization may be, for example:

$$x1 \leq 2 \leq \ldots \leq xk \geq x(k+1) \geq \ldots \geq xn \qquad \text{EQN. 4}$$

where range(xk)≅0 and range(x(k+1))≅1

The pattern for valley maximization may be, for example:

$$x1 \geq 2 \geq \ldots \geq xk \leq x(k+1) \leq \ldots \leq xn \qquad \text{EQN. 5}$$

The final pattern for binary maximization may have only two distinct scores (0 or 1), where 0 may signify that the pattern is not satisfied, and 1 may signify that the pattern is satisfied. The binary pattern may be a partial case of the monotonic risk increasing pattern. The pattern for binary maximization may be for example:

$$x1=2=\ldots xk<x(k+1)=\ldots =xn \qquad \text{EQN. 6}$$

Pattern forcing may use for example the following quadratic constrained function:

$$\frac{1}{2} * x \cdot P \cdot x + q \cdot x + r \qquad \text{EQN. 7}$$

where P is a matrix, x is a score, q is a vector representing pattern constraints, and r is a constant representing boundary constraints The vector q may contain the ranges of each KI for a variable. For example, if a variable is related to the number of days since the last login, then the KI buckets and corresponding scores may be, in one example:

| Value | Score |
| --- | --- |
| 0 < Days ≤ 5 | $S_1$ |
| 5 < Days ≤ 15 | $S_2$ |
| 15 < Days ≤ 30 | $S_3$ |
| 30 < Days Type equation here | $S_4$ |

Accordingly, q may be in one example:

| 0-5 | 5-15 | 15-30 | >30 |
| --- | --- | --- | --- |

Pattern forcing may include determining if there is a sufficient amount of fraudulent transaction in available data. Pattern forcing may include determining if there are any constraints (predefined cutpoints).

Pattern forcing may use, for example, two types of constraints: boundary constraints and pattern constraints. Constraints may be represented as instances of an object containing the constraints. For example, the following table may be used:

| KI Name | Pattern Type | Lower Bound | Upper Bound |
| --- | --- | --- | --- |
| MultipleTransfersToSamePayeeNew | Monotonic Risk increasing | 10 | 50 |
| NoSelfTransferActivityinHistory | Binary | 0 | 20 |
| RecentPasswordChange | Monotonic Risk increasing | 0 | 20 |
| Activity WithFractionalAmounts | Valley | −40 | 0 |
| ActivityWithRoundedAmounts | Peak | 0 | 10 |
| MultipleAccountsPerPayee | Peak | 0 | 20 |
| BurstInNewPayeeActivity | Monotonic Risk increasing | 0 | 50 |
| PayeeWithLowBalance | Monotonic Risk increasing | −20 | 0 |
| NewSendingAccount | Monotonic Risk increasing | 0 | 30 |
| ActivityWithOldPayeeInCurSes | Monotonic Risk increasing | −50 | 0 |
| RecentAddressChange | Monotonic Risk increasing | 0 | 20 |

A first parameter may contain a vector q representing KI buckets and a second parameter contains the constant r. The constraints may be expressed as for example:

$$q*x+r<0 \qquad \text{EQN. 8}$$

where q is a vector representing pattern constraints, x is a score, and r is a constant representing boundary constraints A boundary constraint may set each score for the bucket into the boundaries based on a set lower bound and a set upper bound. The upper and lower bounds can be set by a business analyst, for example working at a bank or an insurance fraud detection business or department who is familiar with the behavior and logic of a particular KI.

For example, if there is three buckets, and lower bound is −10, and the upper bound is 20:

$$-10 \leq x1 \leq 20 \quad \text{EQN. 9}$$

$$-10 \leq x2 \leq 20 \quad \text{EQN. 10}$$

$$-10 \leq x3 \leq 20 \quad \text{EQN. 11}$$

New instances for each constraint may be created, for example EQN. 6 may be separated into two parts:

$$-10 \leq x1 \quad \text{EQN. 12}$$

$$x1 \leq 20 \quad \text{EQN. 13}$$

From the mathematical function of constraint, format of the vector q and sign of r may be deduced:

$$q*x+r<0 \Rightarrow q*x<-r \quad \text{EQN. 14}$$

$$q*x+r<0 \Rightarrow -q*x>r \quad \text{EQN. 15}$$

Based on for example EQN. 14 and 17, a vector may be created:

$$q=[-1*x1;0*x2;0*x3] \Rightarrow [-1;0;0] \quad \text{EQN. 16}$$

where $r=-10$ $$q=[1*x1;0*x2;0*x3] \Rightarrow [1;0;0] \quad \text{EQN. 17}$$

where $r=-(+20)=-20$

Pattern constraints may use EQN. 7 with $r=0$. For example, if a KI has a peak pattern is:

$$x1 \leq x2 \geq x3 \quad \text{EQN. 18}$$

EQN. 18 may be separated into multiple parts:

$$x1 \leq x2 \quad \text{EQN. 19}$$

$$x2 \geq x3 \quad \text{EQN. 20}$$

where $x \leq y \Rightarrow x-y \leq 0$

A first constraint for $x1 \leq x2$ may be for example:

$$q=[1*x1;-1*x2;0*x3]=[1;-1;0] \quad \text{EQN. 21}$$

A second constraint $x2 \geq x3$ may be for example:

$$q=[0*x1;-1*x2;1*x3]=[0;-1;1] \quad \text{EQN. 22}$$

The difference between increasing or decreasing patterns may be, for example, the position of $-1$ in the vector:
for increasing values: [1; $-1$]
for decreasing values: [$-1$; 1]
For monotonic risk increasing and monotonic risk decreasing, the position of the $-1$ in the vector may be the same for the whole pattern. For peak, valley, and binary maximization, the position of $-1$ in the vector may change during the pattern.

Constraints may be dynamically created for example by indexing the bucket where the position of $-1$ changes in the vector. The processor may iterate over buckets and determine on which indexes should be increased or decreased. For peak and valley maximization, there may be multiple indexes, and the patterns may not be monotonic. Optimization for each index may be calculated, and which iteration of the pattern is the best may be determined. For example, because the pattern is in one embodiment not monotonic, it is not known, before optimization of each index, whether $x1>x2>x3<x4$, or $x1>x2<x3<x4$.

When the indexes are set, a pattern may be dynamically created by iterating over the buckets and creating appropriate vectors. Each pattern may start as increasing until the index is hit, at which point, the pattern will change to decreasing. For monotonic risk decreasing, the index may be set to zero so that the pattern may instantly change from increasing to decreasing. With this technique there may be no need to check which pattern is being used.

When creating patterns dynamically, the total number of buckets created may be needed by an algorithm for calculating the number of constraints. For example, total number of buckets can be an input into the algorithm. The total number of dynamically created constraints may be calculated by for example:

$$\text{number of constrains}=(\text{number of buckets}*2)+(\text{number of buckets}-1) \quad \text{EQN. 23}$$

where (number of buckets*2) relates to using an upper and lower boundary constraints, and (number of buckets-1) relates to pattern constraints between buckets The P matrix may be for example a symmetric matrix where the values for buckets may be set diagonally. For each bucket, Pi may be calculated and Pi may be set into an appropriate position in the matrix P.

$$Pi=(2*(\text{userScoreWeight}+\text{userScoreWeight2}+\text{oobScoreWeight}))*\text{countWeight} \quad \text{EQN. 24}$$

where Pi may be a symmetric matrix P in position i where values for buckets are set diagonally, userScoreWeight may be a first score based on a specific user, a specific type of user, a specific type of transaction, or any combination thereof, userScoreWeight2 may be a second score based on the specific user, oobScoreWeight may be a score weight based on all users' past implementations of data, $$countWeight = \frac{\text{count of } transcation \text{ for bucket}}{\text{count of transaction for } KI}$$

and userScoreWeight, userScoreWeight2, oobScoreWeight are set in a property file.

The Q vector may contain, in each position/bucket i, a value $q_i$ unique for that bucket. A significance penalty test ("SIG penalty test) may be performed during the calculation of each value $q_i$ to determine which subset of equations (level sets of parameters) may be selected. The SIG penalty test may be represented as, for example:

$$\text{abs}(Basic_{AutoScore}-SIG_{AutoScore}) \geq sig.\text{test.diff} \quad \text{EQN. 25}$$

where abs is the absolute value, $Basic_{AutoScore}$ may be an initial score for the bucket, $SIG_{AutoScore}$ may be a score calculated using the significance of the KI, and sig.test.diff may be the distance between $Basic_{AutoD core}$ and $SIG_{AutoScore}$.

The SIG penalty test may be represented as:

$$\frac{SIG_{AutoScore}}{Basic_{AutoScore}} \leq sig \cdot \text{test} \cdot \text{ratio} \quad \text{EQN. 26}$$

$$\text{abs}(Basic_{AutoScore} - SIG_{AutoScore}) \geq sig \cdot \text{test} \cdot \text{ratio} \cdot \textit{diff} \quad \text{EQN. 27}$$

wherein
If the SIG penalty test is true:

$$qi=-2*\text{countWeight}*sig.\text{test.penalty}* \\ (\text{userScoreWeight}*\text{userScore}+ \\ \text{userScoreWeight2}*\text{userScore2}+ \\ \text{oobScoreWiehgt}*\text{oobSCore}) \quad \text{EQN. 28}$$

where where $$countWeight = \frac{\text{count of } transcation \text{ for bucket}}{\text{count of transaction for } KI},$$

oobSCore is an initial score, and sig.test.penalty may be a penalty for weights

If the SIG penalty test is false:

$$qi=-2*countWeight*(userScoreWeight*userscore+ userScoreWeight2*userScore2+ oobScoreWeight*oobScore) \quad \text{EQN. 29}$$

The weights for every iterated solution for each index may be calculated:

$$\text{Distance weight} = \sum_{1}^{indexes} userScoreDistance + userScore2Distance + oobDistance \quad \text{EQN. 30}$$

where $userScoreDistance = userScoreweight *$ $$countWeight*(userScore - solution)^2$$

$userScore2Distance = userScore2Weight *$ $$countWeight*(userScore2 - solution)^2$$

$oobDistance = oobScoreWeight * countWeight *$ $$(oobScore - solution)^2$$

$$countWeight = \frac{\text{count of } transcation \text{ for bucket}}{\text{count of transaction for } KI}$$

The final solution for the pattern forcing may be a minimum from the distance weights for the KI calculated in EQN. 30. In some embodiments of the invention, an initial scenario parameter grid table (e.g., an initial set of parameters) may be generated from the reduced set of KIs and corresponding scores to ensure a smart and efficient search of the parameters' landscape (the full grid of all possible sets of parameters).

The reduced set of KIs and corresponding scores may be evaluated using at least one internal model quality metric, one external model quality metric, or any combination thereof to determine at least one best performing model from the at least one selected relevant predictive model (Step 211) (e.g., determining by the computing device 150, as shown above in FIG. 1).

In some embodiments of the invention, more than one best performing model is selected. In some embodiments of the invention, three best performing models are selected, as can be seen below:

| Scenario | Iteration | Scenario_Quality_Index | Use_Level_Set |
|---|---|---|---|
| Initial Scores | 1 | 5.3 | Yes |
| Auto-Scoring Basic Scores | 1 | 3.17 | Yes |
| Auto-Scoring Significance Scores | 1 | −1.85 | No |
| Pattern Forcing Scores | 1 | 4.2 | Yes |

The at least one internal model quality metric may be based on, for example, a structure of the predictive model, a number of variables or parameters contained in the predictive model which are positively correlated with a penalty, or any combination thereof. The at least one internal model quality metric may depend on a percentile of missed high amounts which does not depend on a positive correlation with a penalty. For example, a threshold such as $10,000 or an actual value (based on real data) which is the 95 percentile for the data itself may be defined, and the percentage of missed transactions for each at least one selected relevant predictive model. The percentage of missed transactions may be converted to a penalty score which is added to a performance matrix. The system may use these measurements within an equation based on penalties which reduce the model's quality. The system may use correctives that increase the model's quality.

The at least one external model quality metric may be based on, for example, prior influence rankings for the parameters in the predictive model, a fraud alert, fraud tag and type, a final workflow state, an alert quality, a ratio of alerted events, detection rate, false-positive rate, number of different fraud scenarios detected or any combination thereof. The final workflow state may include, for example, whether or not a transaction was blocked, a result of an authentication challenge, a suspicious activity report filed, or any combination thereof.

The reduced set of KIs and corresponding scores may be evaluated based on the final workflow state of the actions which trigger the reduced set of KIs. For example, if there are more suspicious activity reports filed for a first range of money than for a second range of money, than the KI triggered by a transfer of the first range of money may need to have a higher score than the KI triggered by a transfer of the second range of money.

Evaluating the first set of level sets may include determining a final model quality score which may be, for example, a function of several quality matrices:

$$\text{final } QM = \Sigma_n{}^i W_i M_i \quad \text{EQN. 31}$$

where QM is a quality matrix, Wi is a weight for a single matrix Mi, the single matrix Mi may be, for example, a matrix for the detection rate ("DR") provided below:

| KI Name | DR |
|---|---|
| Multiple Accounts Per Payee | 17.98% |
| Multiple Main Entities Per Payee | 17.98% |
| Multiple Transfers to Same New Payee | 20.23% |
| Increase in New Payee Activity | 34.83% |
| Multiple Transfers to Same Old Payee | 25.84% |
| Empty Memo | 31.46% |
| Low Total Amount | 23.60 |

A quality matrix may be a matrix based on performance parameters such as detection rate, false positives rate, and coverage such as a fraud alert, fraud tag and type, a suspicious activity report, a final workflow state, an alert quality, agent feedback, an authentication outcome, a number of unauthorized scenarios detected, alert volume, or any combination thereof. The quality metrics, or a transformation of them may be used evaluate model performance.

An example of a quality matrix for final sensitivity metrics for multiple KIs may include values for the Cumulative Abnormal Returns ("Cum_AR"); Separation; Detection Rate ("DR"), Value Detection Rate ("VDR"); False Positive Rate ("FPR"), Detection Rate Impact ("DRI"), Value Detection Rate Impact ("VDRI"), False Positive Rate Impact ("FPR"), as well as a final sensitivity metric for each KI, as provided below:

| KI Name | Cum_AR | Separation | DR | VDR | FPR | Final Sensitivity Metric |
|---|---|---|---|---|---|---|
| Multiple Accounts Per Payee | 0.34% | 17.64% | 17.98% | 20.27% | 196 | 2047.6 |
| Multiple Main Entities Per Payee | 0.34% | 17.64% | 17.98% | 20.27% | 196 | 2047.6 |
| Multiple Transfers to Same New Payee | 0.35% | 19.88% | 20.23% | 23.76% | 178 | 1842.3 |
| Increase in New Payee Activity | 0.35% | 34.49% | 34.83% | 42.74% | 104 | 245.5 |
| Multiple Transfers to Same Old Payee | 0.26% | 25.59% | 25.84% | 29.16% | 103 | 71.2 |
| Empty Memo | 0.33% | 31.14% | 31.46% | 40.27% | 108 | 48.0 |
| Low Total Amount | 0.26% | 23.34 | 23.60 | 28.65 | 113 | 0.3 |

At least one random model with random sets of scores for the KIs of the at least one best performing model from Step 211 may be generated (Step 213) (e.g., generating by the computing device 150, as shown above in FIG. 1). Random sets of scores may be generated using a random number generator.

Gradient-ascent and functional optimization may be performed on the at least one best performing model from Step 211 and the at least one random model from Step 213 to generate a set of at least two new models for each of the at least one best performing model and each of the at least one random model (Step 215) (e.g., performing by the computing device 150, as shown above in FIG. 1). For example, gradient-ascent may be used to generate a parameter in the direction that maximizes the target function which is relatively close to the given parameter, and a parameter which maximizes the target function which is a bit farther from the given parameter, for each of the at least one best performing model and each of the at least one random model.

Gradient ascent may be a first-order optimization algorithm. A local maximum of a function may be found using gradient ascent by taking steps proportional to a positive of the gradient (or of the approximate gradient) of the function at a current point.

For example, gradient ascent may be based on the observation that if the multi-variable function F(x) is defined and differentiable in a neighborhood of a point a, then F(x) increases fastest if one travels from a in the direction of the positive gradient of F at a, +ΔF(a). It follows that, if b=a+γΔF(a) and γ is small enough, then F(b)≥F(a).

In other words, the term γΔF(a) is added to a to move with the gradient, namely upwards towards the maximum. With this observation in mind, $X_0$ may be a first guess for a local maximum of F, and sequence $X_0$, $X_1$, $X_2$, $X_3$ can be considered such that $X_{n+1}=X_n+\gamma_n\Delta F(X_n)$, n≥0.

Preferably, the sequence $(X_n)$ converges to the desired local maximum in, for example, the following equation:

$$F(X_1) \le F(2) \le F(X_3) \le \ldots \le F(X_n) \qquad \text{EQN. X31}$$

Note that the value of the step size γ may be allowed to change at each iteration. With certain assumptions on the function F (for example, F concave and ΔF Lipschitz) and particular choices of γ (e.g., chosen via a line search that satisfies the Wolfe conditions), convergence to a local maximum may be guaranteed. When the function F is concave, all local maximum are also global maxima, so in this case gradient ascent may converge to the global solution.

Figure 3:
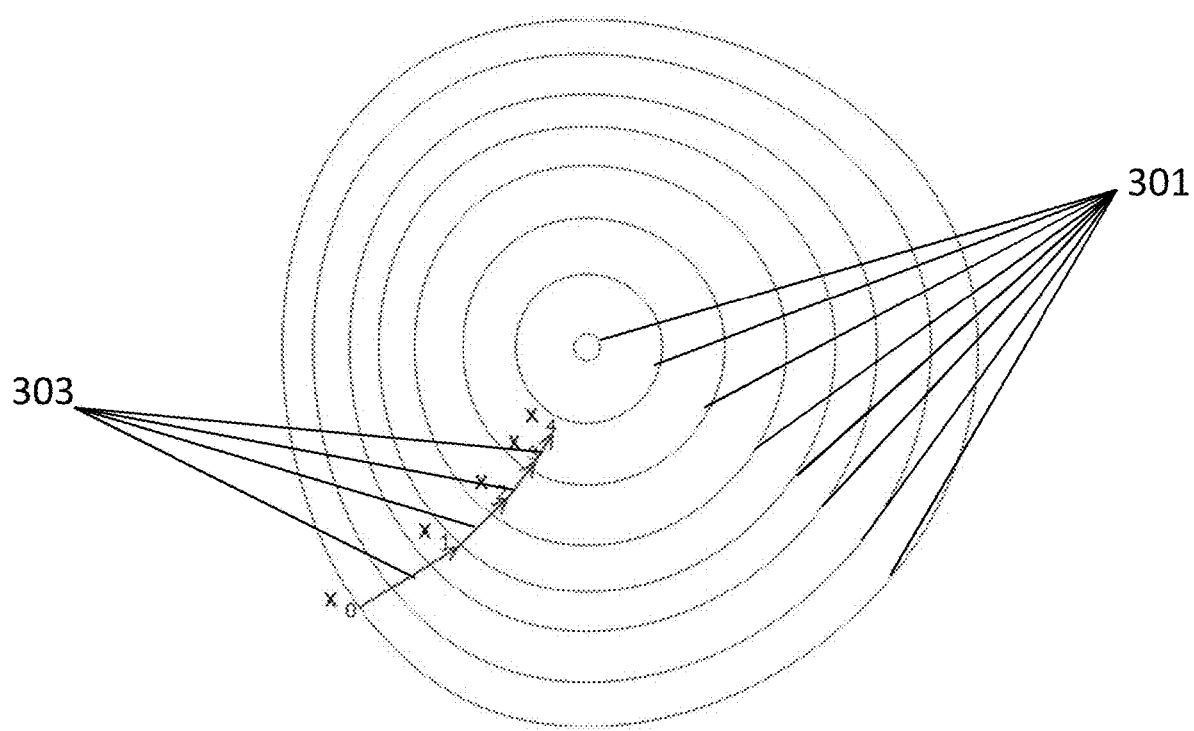
FIG. 3 is an example of gradient ascent on a series of level sets for a two-dimensional space, according to an illustrative embodiment of the invention.

An example of such a process is illustrated in FIG. 3. FIG. 3 is an example of gradient ascent on a series of level sets for a two-dimensional space, according to an illustrative embodiment of the invention.

In FIG. 3, F is assumed to be defined on the plane, and that its graph has a peak shape. FIG. 3 include contour lines 301, which may be the regions on which the value of F is constant. An arrow 303 originating at a point shows the direction of the positive gradient at that point. Note that the (positive) gradient at a point is orthogonal to the contour line 301 going through that point. The gradient ascent points to the top of the peak, that is, to the point where the value of the function F is maximal.

Gradient-ascent functional optimization may include, for example, performing cubic-spline interpolation and simulated annealing.

Spline interpolation is a form of constructing new data points within a range of a discrete set of known data points Cubic-spline interpolation is a type of spline interpolation which may produce a smoother interpolating polynomial with smaller error than other interpolating polynomials such as Lagrange polynomial and Newton polynomial. Simulating annealing is a method for solving unconstrained and bound-constrained optimization problems which may include approximating a global optimum of a given function.

Quality metrics may be used to determine at least one best performing new model (Step 217) (e.g., determining by the computing device 150, as shown above in FIG. 1).

A level of improvement between the best performing generated new model and the at least one best performing model may be determined (Step 219) (e.g., determining, by the computing device 150, as shown above in FIG. 1). For example, quality metrics, or a transformation of them may be used to determine the performance ranking of the best performing generated new model and the at least one best performing model, and a level of improvement may be obtained the difference between the performance ranking of the best performing generated new model and the at least one best performing model.

If the level of improvement between the best performing generated new model and the at least one best performing model is below a predetermined threshold, the best performing generated new model may be selected as an optimized predictive model (Step 223) (e.g., selecting, by the computing device 150, as shown above in FIG. 1).

If the level of improvement is above a predetermined threshold, operations 213-219 may be repeated or iterated using the best performing new model instead of the at least one best performing model from Step 219, for example until the level of improvement is equal to or below the predetermined threshold (Step 221) (e.g., iterating, by the computing device 150, as shown above in FIG. 1).

The optimized predictive model may be used, for example, to determine if a transaction is fraudulent. For example, each score for each triggered KI of the optimized predictive model may be added together to generate the risk score of a particular transaction. If the risk score of a particular transaction is above a predetermined threshold, then the account holder may be notified, the transaction may be blocked (e.g., by sending a signal to an entity requesting authorization of the transaction), the account holder may be asked for an authentication, or any combination thereof.

Unless explicitly stated, the embodiments of the invention described herein are not constrained to a particular order or sequence. Additionally, some of the described embodiments of the invention or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer implemented method for optimization of model parameters of at least one predictive model for detecting suspicious financial activity, the predictive model for determining a risk score and comprising functions, each function having a plurality of key indicators and a score corresponding to each of the key indicators, each of the key indicators being a range of values corresponding to its function, the method comprising:
receiving, by a processor, the at least one predictive model;
receiving, by the processor, information regarding financial transaction data, financial account profile data, fraud alert feedbacks, or any combination thereof;
determining, by the processor, an influence ranking for each key indicator in the at least one predictive model based on the received information and based on sensitivity analysis techniques;
selecting, by the processor, a reduced set of key indicators and corresponding scores to optimize from each of the at least one predictive model, each key indicator and corresponding score in the reduced set having an influence ranking above a predetermined influence ranking;
evaluating, by the processor, each reduced set of key indicators and corresponding scores using quality metrics;
based on the evaluation of each reduced set, selecting, by the processor, a best performing model candidate;
generating, by the processor, at least one random model, the random model having random sets of scores for key indicators of the best performing model candidate;
performing, by the processor, gradient-ascent functional optimization on the best performing model candidate and the at least one random model to generate a set of at least two new models for each of the best performing model candidate and the at least one random model;
calculating, by the processor, a performance ranking of each new model in the set of new models; and
selecting, by the processor, an optimized model, wherein the optimized model is the new model with the highest performance ranking.

2. The method of claim 1, further comprising determining a level of improvement between the optimized model and the best performing model candidate.

3. The method of claim 2, wherein,
if the level of improvement between the optimized model and the best performing model candidate is above a predetermined threshold, iteratively:
generating at least one new random model, the at least one new random model having random sets of scores for key indicators of the optimized model,
performing, by the processor, gradient-ascent functional optimization on the optimized model and the at least one random model to generate a set of at least two additional models for each of the optimized model and the at least one new random model,
calculating, by the processor, a performance ranking of each additional model in the set of additional models,
selecting, by the processor, a new optimized model, wherein the new optimized model is the additional model with the highest performance ranking,
determining a level of improvement between the additional model with the highest performance ranking and the optimized model, and
replacing the scores for the optimized model with the scores of the new optimized model if the new optimized model is an improvement of the optimized model; and
if the level of improvement between the optimized model and the best performing model candidate is equal to or below a predetermined threshold, selecting the optimized model for detecting suspicious financial activity.

4. The method of claim 1, further comprising, selecting at least one relevant model from the received at least one predictive model based on a type of a financial account from which funds are to be transferred from, the amount of money being transferred, or any combination thereof.

5. The method of claim 4, wherein
the influence ranking is determined for each key indicator in the at least one relevant model based on the received information and based on the sensitivity analysis techniques; and
the reduced set of key indicators and corresponding scores to optimize are selected from the at least one relevant model.

6. The method of claim 1, wherein selecting a reduced set of key indicators and corresponding scores further comprises:
for each key indicator and corresponding score in the at least one predictive model, determining, by the processor, if there is another key indicator and corresponding score in the at least one predictive model which forms a pair of key indicators with a Pearson value over a predetermined Pearson value; and
for each pair of key indicators with a Pearson value over the predetermined Pearson value, removing, by the processor, the key indicator and corresponding score of the key indicator with lowest influence ranking in the pair of key indicators with a Pearson value over the predetermined Pearson value from the reduced set of key indicators.

7. The method of claim 6, wherein the predetermined Pearson value is approximately 0.7.

8. The method of claim 1, further comprising:
determining the risk score of a transaction by adding together each score for each key indicator of the reduced set of key indicators in the optimized model; and
if the risk score of the transaction is above a predetermined risk score:

notifying an account holder of the account from which the transaction originated, blocking the transaction, requesting authentication from the account holder, or any combination thereof.

9. The method of claim 1, wherein:

receiving the at least one predictive model comprises receiving, by the processor, a plurality of predictive models;

selecting the best performing model candidate comprises selecting, by the processor, more than one best performing model candidates based on the evaluation of each reduced set; and the gradient-ascent functional optimization is performed, by the processor, on the more than one best performing model candidates and the at least one random model to generate a set of at least two new models for each of the best performing model candidates and the at least one random model.

10. A system for optimization of model parameters of at least one predictive model for detecting suspicious financial activity, the predictive model for determining a risk score and comprising functions, each function having a plurality of key indicators and a score corresponding to each of the key indicators, each of the key indicators being a range of values corresponding to its function, the system comprising:

a server, and a processor configured to:

receive the at least one predictive model, receive information regarding financial transaction data, financial account profile data, fraud alert feedbacks, or any combination thereof from the server, determine an influence ranking for each key indicator in the at least one predictive model based on the received information and based on sensitivity analysis techniques, select a reduced set of key indicators and corresponding scores to optimize from each of the at least one predictive model, each key indicator and corresponding score in the reduced set having an influence ranking above a predetermined influence ranking, evaluate each reduced set of key indicators and corresponding scores using quality metrics, select a best performing model candidate based on the evaluation of each reduced set, generate at least one random model, the random model having random sets of scores for key indicators of the best performing model candidate, perform gradient-ascent functional optimization on the best performing model candidate and the at least one random model to generate a set of at least two new models for each of the best performing model candidate and the at least one random model, calculate a performance ranking of each new model in the set of new models, and select an optimized model, wherein the optimized model is the new model with the highest performance ranking.

11. The system of claim 10, wherein the processor is configured to determine a level of improvement between the optimized model and the best performing model candidate.

12. The system of claim 11, wherein the processor is configured to:

if the level of improvement between the optimized model and the best performing model candidate is above a predetermined threshold, iteratively:

generate at least one new random model, the at least one new random model having random sets of scores for key indicators of the optimized model;

perform gradient-ascent functional optimization on the optimized model and the at least one random model to generate a set of at least two additional models for each of the optimized model and the at least one new random model;

calculate a performance ranking of each additional model in the set of additional models;

select a new optimized model, wherein the new optimized model is the additional model with the highest performance ranking;

determine a level of improvement between the additional model with the highest performance ranking and the optimized model;

replace the scores for the optimized model with the scores of the new optimized model if the new optimized model is an improvement of the optimized model; and if the level of improvement between the optimized model and the best performing model candidate is equal to or below a predetermined threshold, select the optimized model for detecting suspicious financial activity.

13. The system of claim 10, wherein the processor is configured to select at least one relevant model from the received at least one predictive model based on a type of a financial account from which funds are to be transferred from, the amount of money being transferred, or any combination thereof.

14. The system of claim 13, wherein the processor is configured to:

determine the influence ranking for each key indicator in the at least one relevant model based on the received information and based on the sensitivity analysis techniques; and select the reduced set of key indicators and corresponding scores from the at least one relevant model to optimize.

15. The system of claim 10, wherein the processor is configured to:

for each key indicator and corresponding score in the at least one predictive model, determine if there is another key indicator and corresponding score in the at least one predictive model which forms a pair of key indicators with a Pearson value over a predetermined Pearson value; and for each pair of key indicators with a Pearson value over the predetermined Pearson value, remove the key indicator and corresponding score of the key indicator with lowest influence ranking in the pair of key indicators with a Pearson value over the predetermined Pearson value from the reduced set of key indicators.

16. The system of claim 15, wherein the predetermined Pearson value is approximately 0.7.

17. The system of claim 10, wherein the processor is configured to:

determine the risk score of a transaction by adding together each score for each key indicator of the reduced set of key indicators in the optimized model; and if the risk score of the transaction is above a predetermined risk score:

notify an account holder of the account from which the transaction originated, block the transaction, request authentication from the account holder, or any combination thereof.

18. The system of claim 10, wherein the processor is configured to:
    receive a plurality of predictive models;
    select more than one best performing model candidates based on the evaluation of each reduced set; and
    perform gradient-ascent functional optimization on the more than one best performing model candidates and the at least one random model to generate a set of at least two new models for each of the best performing model candidates and the at least one random model.

* * * * *